US008233575B2

(12) United States Patent
Zoltowski

(10) Patent No.: US 8,233,575 B2
(45) Date of Patent: Jul. 31, 2012

(54) OPEN LOOP CYCLOSTATIONARITY BASED TIMING RECOVERY FOR ACCELERATED TIMING ACQUISITION IN FREQUENCY SELECTIVE CHANNELS

(75) Inventor: Michael D. Zoltowski, West Lafayette, IN (US)

(73) Assignee: Zenith Electronics LLC, Lincolnshire, IL (US)

(*) Notice: Subject to any disclaimer, the term of this patent is extended or adjusted under 35 U.S.C. 154(b) by 3062 days.

(21) Appl. No.: 10/278,350

(22) Filed: Oct. 23, 2002

(65) Prior Publication Data

US 2003/0123533 A1 Jul. 3, 2003

Related U.S. Application Data

(60) Provisional application No. 60/336,071, filed on Oct. 25, 2001.

(51) Int. Cl.
*H04L 7/00* (2006.01)

(52) U.S. Cl. ........ 375/355; 375/345; 375/232; 375/343; 375/260; 375/350; 370/203; 370/208; 370/316

(58) Field of Classification Search .................. 375/225, 375/345, 232, 343, 355, 350, 260; 370/208, 370/203, 316
See application file for complete search history.

(56) References Cited

U.S. PATENT DOCUMENTS

| 5,454,015 A * | 9/1995 | Olafsson ...................... 375/345 |
| 6,067,319 A * | 5/2000 | Copeland ..................... 375/232 |
| 6,449,244 B1 * | 9/2002 | Loseke ......................... 370/208 |
| 6,785,349 B1 * | 8/2004 | Rosenlof et al. ............. 375/343 |
| 7,113,559 B2 * | 9/2006 | Baas et al. ..................... 375/350 |

OTHER PUBLICATIONS

M. D. Zoltowski et al., "Closed-Form 2D Angle Estimation With Rectangular Arrays Via DFT Beamspace ESPRIT", Signals, Systems and Computers, 1994, pp. 682-687.

Miyake et al., "A New Timing Extraction Method and Data Interpolation for Block Demodulation", Speech Processing 2, Digital Signal Processing, International Conference on Acoustics, May 23, 1989, pp. 1223-1226.
Moon et al., "Timing Recovery in CMOS using Nonlinear Spectral-line Method", IEEE May 5, 1996, Custom Integrated Circuits Conference, pp. 13-16.
M. D. Zoltowski et al., "Closed-Form 2D Angle Estimation With Rectangular Arrays in Element Space or Beamspace via Unitary ESPRIT", IEEE Transactions on Signal Processing, vol. 44, No. 2, Feb. 1996, pp. 316-328.
Gini et al., "Frequency Offset and Symbol Timing Recovery in Flat-Fading Channels: A Cyclostationary Approach", IEEE Transactions on Communications, vol. 46, No. 3, Mar. 1998, pp. 400-411.
Gardner, "Signal Interception: A Unifying Theoretical Framework for Feature Detection", IEEE Transactions on Communications, vol. 36, No. 8, Aug. 1988, pp. 897-906.
Gardner, "A BPSK/QPSK Timing-Error Detector for Sampled Receivers", IEEE Transactions on Communications, vol. Com-34, No. 5, May 1986, pp. 423-429.
Houcke et al., "Joint Blind Equalization and Estimation of the Symbol Period: A Contrast Function Approach", in ICASSP 2001, pp. 2545-2548.
Koblents et al., "Asynchronous Timing Recovery in DSP Based PSK Modems", in ASILOMAR, Oct. 2-28, 1992, vol. 2, pp. 632-641.
A. Papoulis, "Probability, Random Variables and Stochastic Processes", $3^{rd}$ Edition, ISBN 0-07-048477-5, p. 395, 1991.

* cited by examiner

*Primary Examiner* — Eva Puente

(57) ABSTRACT

An error between the rate $f_{sym}$ at which data are received and the rate $f_s$ at which the data are sampled in is determined by processing a received signal with a nonlinear operator, performing a DFT on the processed signal to produce a plurality of DFT bins each characterized by a respective frequency, determining a dominant spectral component $k_0$ from at least two of the DFT bins whose frequencies are substantially close to the frequency of the dominant spectral component $k_0$, and determining the data rate $f_{sym}$ from the dominant spectral component $k_0$.

30 Claims, 3 Drawing Sheets

5.38 = 1/(2T$_{sym}$)

OPEN LOOP CYCLOSTATIONARITY BASED TIMING RECOVERY FOR ACCELERATED TIMING ACQUISITION IN FREQUENCY SELECTIVE CHANNELS

RELATED APPLICATIONS

The present application claims the benefit of Provisional Application Ser. No. 60/336,071 filed on Oct. 25, 2001.

TECHNICAL FIELD OF THE INVENTION

The present invention relates to timing recovery in digital receivers.

BACKGROUND OF THE INVENTION

Digital receivers typically sample the received signal, and process these samples in order to perform a variety of functions. It is important in such receivers to sample the received signal at the instants when a data element such as a symbol is present. Accordingly, receivers recover the timing at which data elements are received and use this timing to control sampling of the received signal.

Timing recovery deals with finding the ideal sample times to recover the received symbols from a received signal. Mismatch between the transmitter and receiver clocks complicates the recovery process because slight differences between these clocks causes a signal to be sampled at the wrong times, contributing to intersymbol interference.

One popular technique for recovering timing in a receiver is known as the Gardner technique. FIG. 1 illustrates a waveform representing data that might be received at a receiver. In the limited case of FIG. 1, the data is +1 −1 −1 +1. This waveform assumes that the transmitted data is confined to a binary constellation containing only values of −1 and +1, although it can be shown that the Gardner technique works as well for larger constellations. As shown by FIG. 1, the received signal is sampled at two times the data rate.

The Gardner technique essentially forms a timing error according to b(a−c). As long as the sampling is exactly synchronized with respect to the received data, the quantity b(a−c) is zero. For example, in the case of a transition from +1 to −1 as shown in FIG. 1, b is zero so that the quantity b(a−c) is zero. In the case of no transition so that two adjacent bits have the same value such as −1 and −1 as shown in FIG. 2, b is no longer zero. However, a and c have the same value so that the quantity b(a−c) is again zero.

If the sampling timing is not exactly synchronized to the received data, the quantity b(a−c) is not zero but, instead, takes on a value that is a measure of how far off the sampling is from the optimal sampling instants. This value is the timing error and may be used to re-synchronize the sampler to the received data.

Although the Gardner technique works reasonably well in the case of white Gaussian noise such as electronic thermal noise or atmospheric noise, it does not work as well in the case of multi-path reception of the transmitted signal.

The present invention relates to the accurate recovery of timing even in the presence of multi-path reception of a transmitted signal.

SUMMARY OF THE INVENTION

In accordance with one aspect of the present invention, a method is provided to determine an error between the rate $f_{sym}$ at which data are received and the rate $f_s$ at which the data are sampled in a receiver. The method comprises the following: processing a received signal by a nonlinear operator; performing a DFT on the processed signal to produce a plurality of DFT bins each characterized by a respective frequency; determining a dominant spectral component $k_0$ from at least two of the DFT bins whose frequencies are substantially close to the frequency of the dominant spectral component $k_0$; and, determining the data rate $f_{sym}$ from the dominant spectral component $k_0$.

In accordance with another aspect of the present invention, a method is provided to correct the sampling rate $f_s$ of a receiver so that the sampling rate $f_s$ matches the rate $f_{sym}$ at which data are received by the receiver. The method comprises the following: processing a received signal by a nonlinear operator; performing a DFT on the processed signal to produce a plurality of DFT bins each characterized by a respective frequency; determining a dominant spectral component $k_0$ from two of the DFT bins whose frequencies are substantially close to the frequency of the dominant spectral component $k_0$; determining an error based on the dominant spectral component $k_0$, wherein the error indicates an offset between $f_s$ and $f_{sym}$; and, adjusting the sampling rate $f_s$ to reduce the error.

In accordance with still another aspect of the present invention, a method is provided to determine a relationship between a sampling rate $f_s$ at which a receiver samples received data and a data receive rate $f_{sym}$ at which the data are received by the receiver. The method comprises the following: processing a received signal by a nonlinear operator; sampling the processed received signal to produce signal samples; performing a DFT on the signal samples to produce a plurality of DFT bins each characterized by a corresponding frequency; determining a dominant spectral component $k_0$ from two of the DFT bins whose corresponding frequencies are equal or closest to $f_{sym}$; and, determining the relationship between the sampling rate $f_s$ and the data receive rate $f_{sym}$ based on the dominant spectral component $k_0$.

BRIEF DESCRIPTION OF THE DRAWINGS

These and other features and advantages will become more apparent from a detailed consideration of the invention when taken in conjunction with the drawings in which.

DETAILED DESCRIPTION

While the timing estimator disclosed herein is equally applicable to other linear modulation techniques, the present invention is disclosed herein with particular reference to 8 VSB modulation, such as that currently employed in digital television. The 8 VSB signal is a linearly modulated 8-ary PAM signal with real-valued symbols b[k] and a complex pulse shape $p_v(t)$. The transmitted signal may be expressed by the following equation:

$$x_v(t) = \sum_k b[k]p_v(t-kT_{sym}). \quad (1)$$

Figure 1:
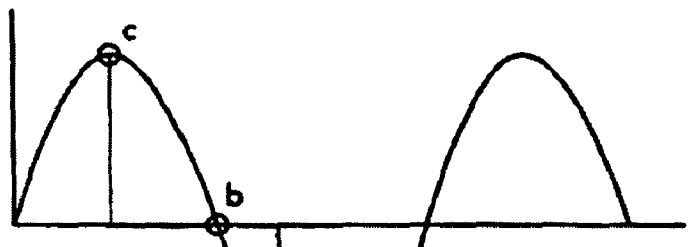
FIGS. 1 and 2 illustrate waveforms useful in explaining a prior art approach to the correction of the sampling rate in a receiver.
Figure 2:
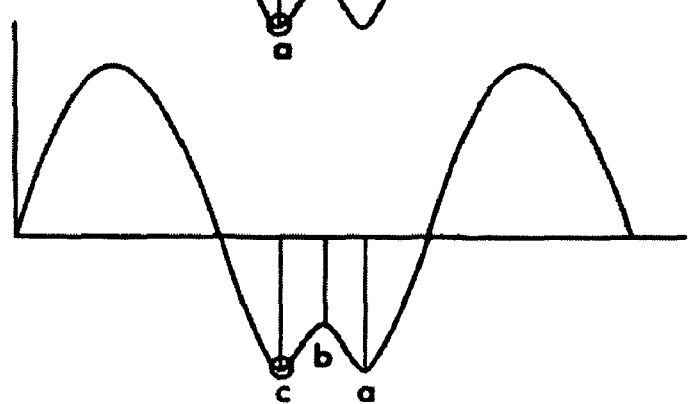
Figure 3:
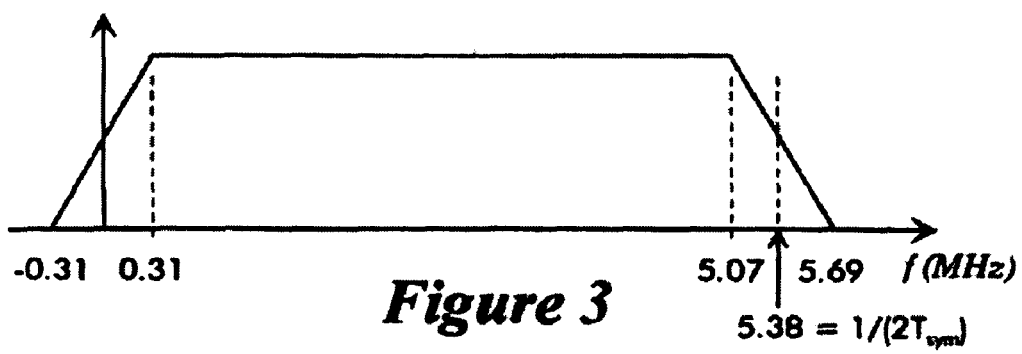
FIG. 3 illustrates an 8 VSB spectrum at baseband.

The symbols sent every $T_{sym}$ seconds are assumed to be independent and identically distributed. These symbols are taken from the alphabet having the following amplitudes:

$$b[m]=(2m-9)d, \text{ for } m=1,2,\ldots,8$$

where 2d is the distance between adjacent symbols. The 8 VSB pulse shape $p_v(t)$ is the complex root raised cosine pulse shape whose spectrum is shown in FIG. 3.

The 8 VSB signal $x_v(t)$ is passed through a channel denoted c(t) and is received at the receiver to yield a noisy signal according to the following equation:

$$r_v(t)=c(t)*x_v(t)+v(t) \quad (2)$$

where * denotes convolution and v(t) is the zero-mean complex additive white Gaussian noise with independent and identically distributed real and imaginary components, each with a variance $\sigma_n^2$. In "all-digital" receivers, the received signal is, prior to matched filtering, oversampled by some multiple (such as two) of the nominal symbol rate $f_{sym}=(1/T_{sym})$ to give the digital signal $r_v[n]$.

The cyclostationarity technique disclosed herein recovers information about the symbol rate by first passing the received signal through a non-linearity to detect a discrete spectral component corresponding to the symbol rate and then filtering or using some other technique to determine the frequency of the spectral component.

In one embodiment of the present invention, this non-linearity is squaring. Accordingly, the received signal represented by equation (2) is squared to produce the following equation:

$$r_v^2(t) = (x_v(t)*c(t) + v(t))^2 \quad (3)$$
$$= (x_v(t)*c(t))^2 + 2v(t)(x_v(t)*c(t)) + v^2(t)$$

An interesting result of simply squaring the signal rather than squaring the magnitude of the signal is that the complex-valued noise averages to zero. This result means that the expected value of the noise, $\epsilon\{v^2(t)\}$, is zero. Moreover, because the noise is assumed zero-mean and independent of the data, the expected value of the cross terms in equation (3) is also zero. Therefore, taking the expected value removes all terms involving the noise v(t) according to the following equation:

$$\epsilon\{r_v^2(t)\}=\epsilon\{(x_v(t)*c(t))^2\} \quad (4)$$

Combining equations (1) and (4) produces the following equation:

$$\epsilon\{r_v^2(t)\} = \sigma_b^2 \sum_k p_c^2(t-kT_{sym}) \quad (5)$$

where $p_c(t)=p_v(t)*c(t)$

Equation (5) describes a signal that is periodic with a period $T_{sym}$. Therefore, equation (5) can be expressed as a Fourier series according to the following equation:

$$\epsilon\{r_v^2(t)\} = \sum_k c_k e^{j2\pi k f_{sym}} \quad (6)$$

where $c_k$ are the Fourier coefficients.

For a band limited signal, squaring the signal doubles the bandwidth of the signal. For the baseband 8 VSB signal, the baseband spectrum extends from −0.31 MHz to 5.69 MHz. Thus, the squared signal has energy in the frequency interval from −0.62 MHz to 11.38 MHz. Because $f_{sym}$=10.72 MHz for the 8 VSB signal, all Fourier series coefficients are zero except $c_0$ and $c_1$.

While the relationship between the receiver's sampling rate $f_s$ and the true symbol rate $f_{sym}$ is not known precisely at the receiver, it is reasonable to assume that the receiver has a good initial estimate of the true symbol rate. Use of a crystal oscillator having an accuracy of ±100 parts per million (ppm) means that it can reasonably be assumed that the receiver can determine the symbol rate $f_{sym}$ of the received signal relative to its own clock within ±100 ppm. Based on these assumptions, if a data signal has a symbol rate of 10 MHZ, the symbol rate is known within ±1000 Hz at the receiver. However, even this small offset can cause severe error performance over time unless this error is corrected.

Figure 4:
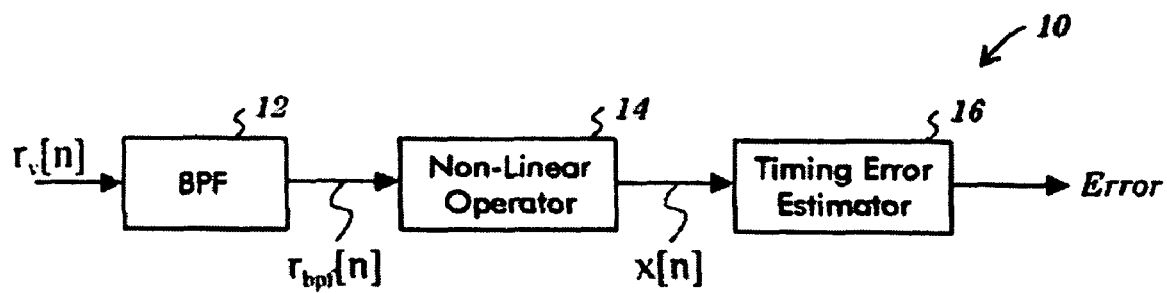
FIG. 4 illustrates a timing error detector according to an embodiment of the present invention.

In one embodiment of the present invention, the received signal is oversampled to produce samples $r_v[n]$. As shown in FIG. 4, the oversampled signal $r_v[n]$ is supplied to a timing error detector 10 that includes a bandpass filter 12 operating at half the nominal symbol rate ($f_{sym}/2$). The bandpass filter 12 bandpass filters the oversampled signal $r_v[n]$. The impulse response of the bandpass filter 12, for example, may be given by the following equation:

$$h_{bpf}[n] = \cos\left(\pi\frac{n}{2K}\right)\cos\left(\pi\frac{n}{U_{os}}\right) \quad (7)$$

where K is the filter length and $U_{os}$ is the oversampling factor.

Figure 5:
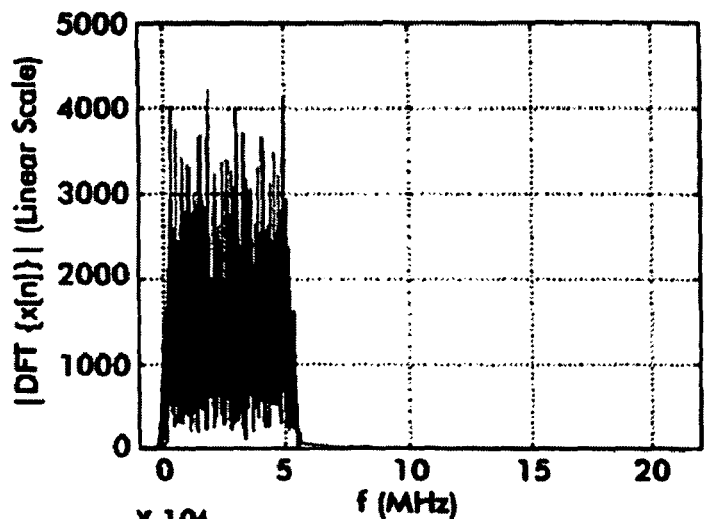
FIG. 5 illustrates a DFT (Discrete Fourier Transform) of a received signal.
Figure 6:
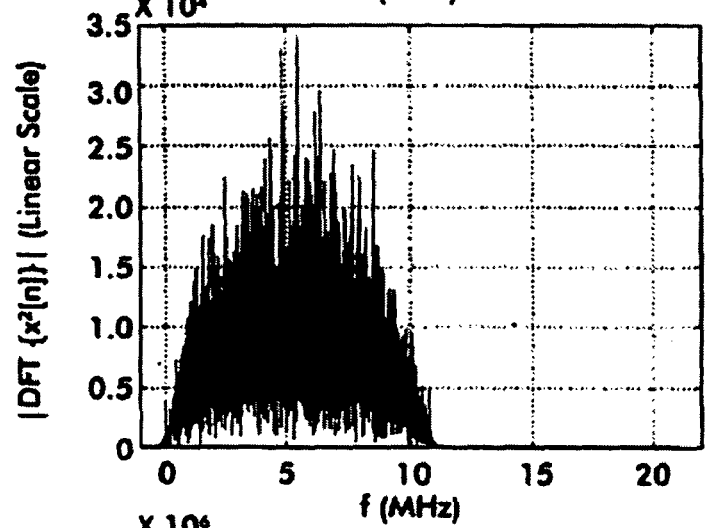
FIG. 6 illustrates a DFT of a squared received signal.

The resulting signal $r_{bpf}[n]$ is passed through a non-linear operator 14 that imposes a non-linear operation, such as squaring, on the signal $r_{bpf}[n]$ in order to boost the spectral line at the digital frequency corresponding to the symbol rate $f_{sym}$ relative to the other spectral lines. For example, FIG. 5 shows a DFT of a received signal without the non-linear operation. The symbol rate $f_{sym}$ is buried among the other frequency components of the received signal and cannot be readily distinguished. FIG. 6 shows the effects on the DFT of squaring the received signal samples. The symbol rate $f_{sym}$ rises above the other frequency components and, thereby, is more readily distinguished. As also can be seen by comparing FIGS. 5 and 6, the bandwidth has doubled when the samples of the received signal are squared.

The non-linearity is preferably chosen with the nominal sampling rate in mind so that the signal's spectrum is not aliased near the symbol rate $f_{sym}$. For an 8 VSB signal that is squared, sampling at twice the nominal symbol rate is enough to prevent aliasing of the squared signal.

The signal x[n] resulting from the non-linear operator 14 is modeled over a small frequency interval around the true symbol rate as a single complex exponential plus white noise according to the following equation:

$$x[n]=\alpha z[n]+v[n] \quad (7)$$

where $$z[n] = e^{j\frac{2\pi k_0 n}{N}} \quad (8)$$

where α is a complex scalar, and where v[n] is the noise component. It is then possible to compute two Discrete Fourier Transform (DFT) values $\tilde{Z}(k)$ and $\tilde{Z}(k+1)$ near the nominal value of $k_0$ that corresponds to the rate $f_{sym}$ at which data is received, to determine $k_0$ from these values, and to determine the relationship between $f_{sym}$ and $f_s$ from $k_0$. Subspace based averaging may be used to determine these values such that the effect of noise is minimized.

Accordingly, a timing error estimator 16 performs a DFT on x[n]. A conjugate centrosymmetrized version of the kth bin of the resulting N-point DFT is given by the following equation:

$$\tilde{X}(k) = \sum_{n=0}^{N-1} x[n] e^{-j\frac{2\pi k}{N}\left(n-\frac{N-1}{2}\right)} \quad (9)$$

where x[n] are the received signal samples. Equation (9) can be re-written as a product of vectors according to the following equation:

$$\tilde{X}(k) = \tilde{w}_k^H x \quad (10)$$

where $$\tilde{w}_k^H = \left[ e^{j\frac{2\pi k}{N}\left(\frac{N-1}{2}\right)} e^{j\frac{2\pi k}{N}\left(\frac{N-3}{2}\right)} \ldots e^{-j\frac{2\pi k}{N}\left(\frac{N-1}{2}\right)} \right] \in C^N \quad (11)$$

and where $$x = [x[0]\,x[1] \ldots x[N-1]]^T \in C^N \quad (12)$$

$C^N$ represents the N dimensional complex vector space comprising complex vectors each of length N. The rotated DFT vector $\tilde{w}_k$ is termed conjugate centrosymmetric because its mth element is equal to the conjugate of its (N-m)th element for m=0, ..., N-1. $\tilde{X}(k)$ may be found by first finding the DFT value X(k) and by then post multiplying this value by $$e^{j\frac{2\pi k}{N}\left(\frac{N-1}{2}\right)}.$$

If z[n] is the single complex exponential in equation (8), then the kth bin of the conjugate centrosymmetrized DFT of z[n] evaluated at DFT bin k is given by the following equation:

$$\tilde{Z}(k) = \frac{\sin(\pi(k-k_0))}{\sin\left(\frac{\pi}{N}(k-k_0)\right)} e^{j\frac{2\pi k_0}{N}\left(\frac{N-1}{2}\right)} \quad (13)$$

and the conjugate centrosymmetrized DFT of z[n] evaluated at DFT bin k+1 is given by the following equation:

$$\tilde{Z}(k+1) = \frac{\sin(\pi(k+1-k_0))}{\sin\left(\frac{\pi}{N}(k+1-k_0)\right)} e^{j\frac{2\pi k_0}{N}\left(\frac{N-1}{2}\right)} \quad (14)$$

Using the trigonometric identity sin(A+B)=sin(A)cos(B)+cos(A)sin(B), the numerator of equation (14) becomes −sin(π(k−k_0)). Therefore, dividing equation (13) by equation (14) yields the following equation:

$$\frac{\tilde{Z}(k)}{\tilde{Z}(k+1)} = -\frac{\sin\left(\frac{\pi}{N}(k+1-k_0)\right)}{\sin\left(\frac{\pi}{N}(k-k_0)\right)} \quad (15)$$

Applying the trigonometric identity given above to equation (15) produces the following equation:

$$k_0 = \frac{N}{\pi} \tan^{-1}\left( \frac{\tilde{Z}(k)\sin\left(\frac{\pi}{N}k\right) + \tilde{Z}(k+1)\sin\left(\frac{\pi}{N}(k+1)\right)}{\tilde{Z}(k)\cos\left(\frac{\pi}{N}k\right) + \tilde{Z}(k+1)\cos\left(\frac{\pi}{N}(k+1)\right)} \right) \quad (16)$$

Based on $k_0$, the true symbol rate, i.e., the symbol rate of the received data, can be determined from the following equation:

$$f_{sym} = \frac{k_0}{N} f_s \quad (17)$$

where N is the number of bins in the DFT and $f_s$ is the sampling frequency of the receiver.

The relationship between $f_{sym}$ and $f_s$ should ideally be the design relationship. For example, if the sampling rate is nominally set at twice the symbol rate used by the transmitter, then ideally $f_{sym}=f_s/2$. If the actual symbol rate of the received data, as determined by equations (16) and (17), and $f_s$ do not have this ideal relationship, then the sampling rate of the receiver is adjusted until the ideal relationship is achieved.

The timing error estimator 16 can also determine the timing error by subtracting $k_0$ from k. This timing error may be used to appropriately adjust the sampling frequency of the receiver in order to correctly sample the received signal.

Figure 7:
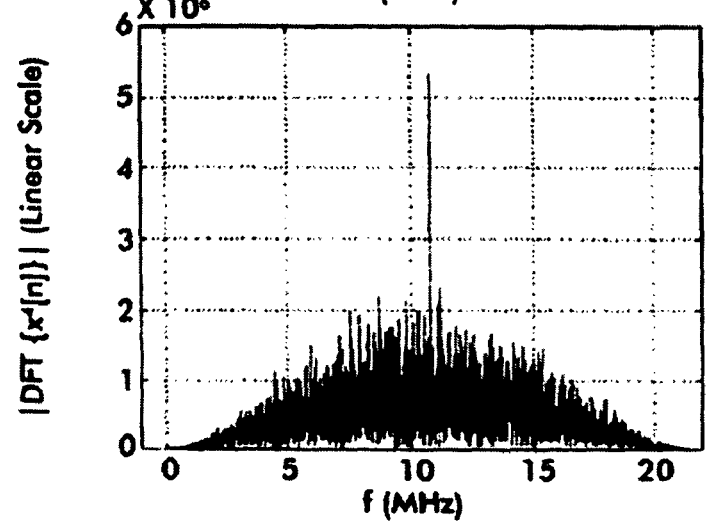
FIG. 7 illustrates a DFT of a received signal raised to the fourth power.

As discussed above, the non-linear operator 14 may be arranged to square the signal from the bandpass filter 12. Instead, other non-linearities can be imposed on the received signal. For example, the received signal may be raised to the fourth power, i.e., $(r_v[n])^4$. FIG. 7 shows the effects on the DFT of raising the received signal samples to the fourth power. The symbol rate $f_{sym}$ rises even more above the other frequency components and, thereby, is even more readily distinguished than is the case of simply squaring the samples. As also can be seen by comparing FIGS. 5 and 7, the bandwidth has quadrupled when the samples of the received signal are raised to the fourth power. For an 8 VSB signal that is raised to the fourth power, sampling at four times the nominal symbol rate is enough to prevent aliasing of the signal raised to the fourth power. When the non-linear operator 14 raises the received signal samples to the fourth power, the bandpass filter 12 becomes unnecessary.

It is preferable for the process described above that values for N and k be chosen so that k<$k_0$<k+1 and so that N<fs/(2Δf) where Δf is the tolerance of the a priori estimate. For example, in the case where the samples are raised to the fourth power so that the sampling is at about four times the symbol rate, N can be set at 4096, and k can be set at 1024 representing the nominal symbol rate $f_{sym}$. The frequency associated with bin k+1 is the next higher frequency. The bin k−1 can be used instead of the bin k+1.

Figure 8:
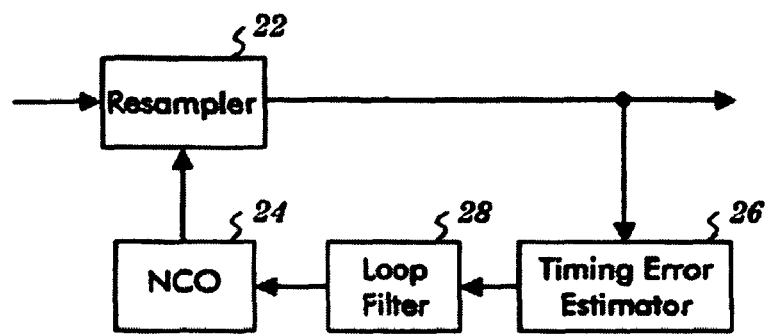
FIG. 8 illustrates an arrangement for correcting the sampling frequency of a receiver based on the timing error detected by the timing error detector shown in FIG. 4; and, FIG. 9 illustrates a loop filter that can be used on the arrangement of FIG. 8.

FIG. 8 shows an arrangement for correcting the sampling frequency of the receiver. The received signal is re-sampled by a re-sampler 22 that receives the samples from an upstream sampler, that effectively reconstructs an analog signal from the samples, and that re-samples the reconstructed analog signal in response to a sampling frequency supplied by a numerically controlled oscillator 24. The samples at the output of the re-sampler 22 are processed by a timing error estimator 26 to detect the error between $f_s$ and $f_{sym}$ as described above, and this error is filtered by a loop filter 28. The filtered error from the loop filter 28 then controls the numerically controlled oscillator 24 to produce the correct sampling frequency for the re-sampler 22. A matched filter may be located in the output of the re-sampler 22 upstream of the timing error estimator 26, or the matched filter may instead be located upstream of the re-sampler 22.

Figure 9:
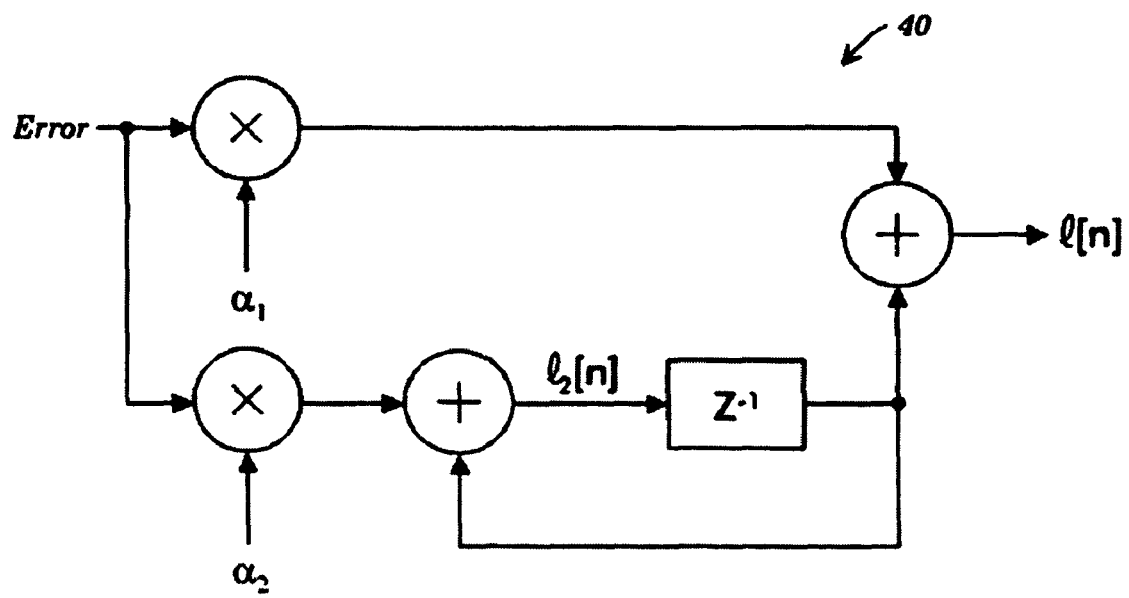

FIG. 9 shows an example of a loop filter 40 that can be used for the loop filter 28 of FIG. 8. The loop filter 40 is a low pass filter that smoothes the error provided by the timing error estimator 26. The smoothed error is denoted in FIG. 9 as l[n]. The quantities $\alpha_1$ and $\alpha_2$ are constants.

If the noise component v[n] in x[n] is removed, $\tilde{X}(k,n)$ and $\tilde{X}(k+1,n)$ can be used in equation (16) in place of $\tilde{Z}(k)$ and $\tilde{Z}(k+1)$ because multiplication by a scalar has no effect on equation (16). One way of removing the noise component in x[n] is to perform subspace-based, or eigenvalue-based, averaging in the frequency domain.

Let $\tilde{X}(k,n)$ and $\tilde{X}(k+1,n)$ be conjugate centrosymmetric N point DFT values of $\{x[n-N+1], \ldots, x[n]\}$ at frequency bins k and k+1, respectively. These DFT values can be grouped as a vector $X=[\tilde{X}(k,n)\tilde{X}(k+1,n)]^T$. Then, the real-valued autocorrelation matrix $R_{xx}$ of the received signal is simply the following expected value: $\epsilon\{X[n]X^H[n]\}$. This matrix has the following form:

$$\operatorname{Re}\{\hat{R}_{xx}[n]\} = \begin{bmatrix} a & b \\ c & d \end{bmatrix}$$

The eigenvectors associated with this matrix have the following form:

$$e_i = \varsigma \left[ \frac{\lambda_i - d}{c} \quad 1 \right]^T \varsigma \in C^l$$

$$e_i = \xi \left[ \frac{b}{\lambda_1 - a} \quad 1 \right]^T \xi \in C^l$$

where $\lambda_l$ are eigenvalues given by the following equation:

$$\lambda_i = \frac{a + d \pm \sqrt{(a-d)^2 + 4bc}}{2}$$

The eigenvector associated with the largest eigenvalue of the real part of the sample correlation matrix $\hat{R}_{xx}[n]$ is a multiple of $Z=[\tilde{Z}(k) \ \tilde{Z}(k+1)]^T$. Therefore, these values of $\tilde{Z}[k]$ and $\tilde{Z}[k+1]$ can be derived from this eigenvector and used in equation (16) to compute $k_0$ which can be used in equation (17) to determine the relationship between $f_s$ and $f_{sym}$.

Because $R_{xx}$ is real valued, only the real part of the vector product $X[n]X^H[n]$ need be included when forming the sample correlation matrix. Because $\hat{R}_{xx}[n]$ is a 2×2 matrix, a simple closed form expression is available for the eigenvectors.

The first DFT values $\tilde{X}(k,N-1)$ and $\tilde{X}(k+1,N-1)$ may be computed gradually (without the need to store or compute all of the twiddle factors $$w_N^{nk} = e^{-j\frac{2\pi kn}{N}},$$

n=0, ..., N−1) using the well known Goertzel algorithm. Subsequent values of $\tilde{X}(k,n)$ and $\tilde{X}(k+1,n)$ for n>N−1 may be found recursively. If X(k,n) is the kth bin of the N point DFT of the current and past N−1 values of x[n], then X(k,n) is given by the following equation:

$$X(k,n) = \sum_{m=0}^{N-1} x[m+n-(N-1)]e^{-j\frac{2\pi km}{N}} \quad (18)$$

and X(k,n) may be expressed in terms of X(k,n−1) according to the following equation:

$$X(k,n) = (X(k,n-1) - x[n-N])e^{-j\frac{2\pi k}{N}} + \quad (19)$$
$$x[n]e^{-j\frac{2\pi k(N-1)}{N}}$$

for n>N−1. Use of equation (19) requires only two complex multiplications and two additions, which is a significant computational savings over equation (18). Furthermore, when k is an integer, equation (19) simplifies even more and requires only one complex multiplication and two additions according to the following equation:

$$X[k,n] = (X[k,n-1] - x[n-N] + x[n])e^{j\frac{2\pi k}{N}}$$

Accordingly, when averaging is used as described above, as each new sample is received, the sample is passed through the non-linear operation. Two conjugate centrosymmetric DFT values are found using the current sample and the previous N−1 samples. These values are used to update the real part of the sample correlation matrix, and the eigenvector having the largest eigenvalue is extracted to give a scaled estimate of $\tilde{Z}(k)$ and $\tilde{Z}(k+1)$. These values are used as per equations (16) and (17) to determine the symbol frequency of the received data.

Modifications of the present invention will occur to those practicing in the art of the present invention. Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

I claim:

1. A method for determining a rate $f_{sym}$ at which data are received comprising:
   processing a received signal by a nonlinear operator;
   performing a DFT on the processed signal to produce a plurality of DFT bins each characterized by a respective frequency;
   determining a dominant spectral component $k_0$ from at least two of the DFT bins whose frequencies are substantially close to the frequency of the dominant spectral component $k_0$; and,
   determining the data rate $f_{sym}$ from the dominant spectral component $k_0$.

2. The method of claim 1 wherein the processing of the received signal by a nonlinear operator comprises squaring the received signal.

3. The method of claim 2 wherein the processing of the received signal comprises sampling the received signal at about twice the rate at which the data are received.

4. The method of claim 1 wherein the determining of a dominant spectral component $k_0$ comprises determining the dominant spectral component $k_0$ according to the following equation:

$$k_0 = \frac{N}{\pi} \tan^{-1}\left(\frac{\tilde{Z}(k)\sin\left(\frac{\pi}{N}k\right) + \tilde{Z}(k+1)\sin\left(\frac{\pi}{N}(k+1)\right)}{\tilde{Z}(k)\cos\left(\frac{\pi}{N}k\right) + \tilde{Z}(k+1)\cos\left(\frac{\pi}{N}(k+1)\right)}\right)$$

wherein N comprises the number of points in the DFT, k and k+1 comprise the DFT bins whose frequencies are substantially close to the frequency of the dominant spectral component $k_0$, and $\tilde{Z}(k)$ and $\tilde{Z}(k+1)$ represent the energy in the bins k and k+1.

5. The method of claim 4 further comprising determining an error between the data rate $f_{sym}$ and a rate $f_s$ at which the data are sampled in a receiver in accordance with a relationship between the sampling rate $f_s$ and the data rate $f_{sym}$ based on the dominant spectral component $k_0$.

6. The method of claim 5 wherein the relationship comprises $f_{sym}=(k_0/N)f_s$.

7. The method of claim 6 wherein the processing of the received signal by a nonlinear operator comprises squaring the received signal.

8. The method of claim 7 wherein the sampling of the received signal comprises sampling the received signal at about twice the rate at which the data are received.

9. The method of claim 1 wherein the determining of a dominant spectral component $k_0$ of the processed received signal comprises:
   determining an autocorrelation of the received signal;
   selecting an eigenvector of the autocorrelation having the largest eigenvalue; and,
   determining the dominant spectral component $k_0$ based on the selected eigenvector.

10. The method of claim 1 wherein the determining of a dominant spectral component $k_0$ of the processed received signal comprises determining the dominant spectral component $k_0$ based on subspace based averaging.

11. A method for correcting a sampling rate $f_s$ of a receiver so that the sampling rate $f_s$ matches a rate $f_{sym}$ at which data are received by the receiver, the method comprising:
   processing a received signal by a nonlinear operator;
   performing a DFT on the processed signal to produce a plurality of DFT bins each characterized by a respective frequency;
   determining a dominant spectral component $k_0$ from two of the DFT bins whose frequencies are substantially close to the frequency of the dominant spectral component $k_0$;
   determining an error based on the dominant spectral component $k_0$, wherein the error indicates an offset between $f_s$ and $f_{sym}$; and,
   adjusting the sampling rate $f_s$ to reduce the error.

12. The method of claim 11 wherein the processing of the received signal by a nonlinear operator comprises squaring the received signal.

13. The method of claim 12 wherein the processing of the received signal comprises sampling the received signal at about twice the rate at which the data are received.

14. The method of claim 11 wherein the processing of a received signal by a nonlinear operator comprises sampling the received signal at the sampling rate $f_s$ and processing the received signal samples by the nonlinear operator, and wherein the determining of a dominant spectral component $k_0$ comprises determining the dominant spectral component $k_0$ according to the following equation:

$$k_0 = \frac{N}{\pi} \tan^{-1}\left(\frac{\tilde{Z}(k)\sin\left(\frac{\pi}{N}k\right) + \tilde{Z}(k+1)\sin\left(\frac{\pi}{N}(k+1)\right)}{\tilde{Z}(k)\cos\left(\frac{\pi}{N}k\right) + \tilde{Z}(k+1)\cos\left(\frac{\pi}{N}(k+1)\right)}\right)$$

wherein N comprises the number of points in the DFT, k and k+1 comprise the DFT bins whose frequencies are substantially close to the frequency of the dominant spectral component $k_0$, and $\tilde{Z}(k)$ and $\tilde{Z}(k+1)$ represent the energy in the bins k and k+1.

15. The method of claim 14 wherein the determining of the error comprises determining a relationship between the sampling rate $f_s$ and the data rate $f_{sym}$ based on the dominant spectral component $k_0$.

16. The method of claim 15 wherein the relationship comprises $f_{sym}=(k_0/N)f_s$.

17. The method of claim 14 wherein the processing of the received signal by a nonlinear operator comprises squaring the received signal.

18. The method of claim 17 wherein the sampling of the received signal comprises sampling the received signal at about twice the rate at which the data are received.

19. The method of claim 11 wherein the determining of a dominant spectral component $k_0$ of the processed received signal comprises:
   determining an autocorrelation of the received signal;
   selecting an eigenvector of the autocorrelation having the largest eigenvalue; and,
   determining the dominant spectral component $k_0$ based on the selected eigenvector.

20. The method of claim 11 wherein the determining of a dominant spectral component $k_0$ of the processed received signal comprises determining the dominant spectral component $k_0$ based on subspace based averaging.

21. The method of claim 11 wherein the adjusting of the sampling rate $f_s$ to reduce the error comprises:
   loop filtering the error;
   adjusting the frequency of a numerically controlled oscillator; and,
   resampling the received signal based on the adjusted frequency.

22. A method for determining a relationship between a sampling rate $f_s$ at which a receiver samples received data and a data receive rate $f_{sym}$ at which the data are received by the receiver, the method comprising:

processing a received signal by a nonlinear operator;
sampling the processed received signal to produce signal samples;
performing a DFT on the signal samples to produce a plurality of DFT bins each characterized by a corresponding frequency;
determining a dominant spectral component $k_0$ from two of the DFT bins whose corresponding frequencies are equal or closest to $f_{sym}$; and,
determining the relationship between the sampling rate $f_s$ and the data receive rate $f_{sym}$ based on the dominant spectral component $k_0$.

23. The method of claim 22 wherein the relationship comprises $f_{sym}=(k_0/N)f_s$, and wherein N comprises the number of points in the DFT.

24. The method of claim 23 wherein the determining of a dominant spectral component $k_0$ comprises evaluating the DFT at bin k, evaluating the DFT at bin k+1, and determining the dominant spectral component $k_0$ based on the evaluations, and wherein $k \leq k_0 \leq k+1$.

25. The method of claim 24 wherein the processing of the received signal by a nonlinear operator comprises squaring the received signal.

26. The method of claim 25 wherein $f_s=2f_{sym}$.

27. The method of claim 24 wherein the evaluating of the DFT at bin k and the evaluating the DFT at bin k+1 comprises:
determining an autocorrelation of the received signal;
selecting an eigenvector of the autocorrelation having the largest eigenvalue; and,
determining the dominant spectral component $k_0$ based on the selected eigenvector.

28. The method of claim 24 wherein the evaluating of the DFT at bin k and the evaluating the DFT at bin k+1 comprises determining the dominant spectral component $k_0$ based on subspace based averaging.

29. The method of claim 22 wherein the processing of the received signal by a nonlinear operator comprises squaring the received signal.

30. The method of claim 29 wherein $f_s=2f_{sym}$.

* * * * *